(12) United States Patent
Bounds et al.

(10) Patent No.: US 10,465,763 B2
(45) Date of Patent: Nov. 5, 2019

(54) END MEMBER ASSEMBLIES AS WELL AS GAS SPRING ASSEMBLIES, SUSPENSION SYSTEMS AND METHODS INCLUDING SAME

(71) Applicant: Firestone Industrial Products Company, LLC, Indianapolis, IN (US)

(72) Inventors: Joseph A. Bounds, Fishers, IN (US); Paul P. Koeske, Fishers, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 102 days.

(21) Appl. No.: 15/529,913

(22) PCT Filed: Nov. 25, 2015

(86) PCT No.: PCT/US2015/062795
§ 371 (c)(1),
(2) Date: May 25, 2017

(87) PCT Pub. No.: WO2016/086201
PCT Pub. Date: Jun. 2, 2016

(65) Prior Publication Data
US 2017/0363169 A1 Dec. 21, 2017

Related U.S. Application Data

(60) Provisional application No. 62/085,212, filed on Nov. 26, 2014.

(51) Int. Cl.
*F16F 9/05* (2006.01)
*B60G 11/27* (2006.01)
(Continued)

(52) U.S. Cl.
CPC .............. *F16F 9/057* (2013.01); *B60G 11/27* (2013.01); *B60G 17/0485* (2013.01);
(Continued)

(58) Field of Classification Search
CPC .......... F16F 9/0454; F16F 9/34; F16F 9/5126; F16F 2222/126; F16F 9/049;
(Continued)

(56) References Cited

U.S. PATENT DOCUMENTS 6,386,524 B1 * 5/2002 Levy ..................... B60G 11/28
267/64.21
8,801,016 B2 8/2014 Leonard
(Continued)

FOREIGN PATENT DOCUMENTS

WO  WO 01/61207    8/2001
WO  WO 2013/181241 12/2013

OTHER PUBLICATIONS

International Search Report and Written Opinion for corresponding PCT Application No. PCT/US2015/062795 dated Mar. 29, 2016.

*Primary Examiner* — Darlene P Condra
(74) *Attorney, Agent, or Firm* — Brian D. McAlhaney; Matthew P. Dugan

(57) ABSTRACT

An end member assembly can include a first end member section and a second end member section that together form an end member volume. A partition section is provided separately and is disposed within the end member volume to separate the end member volume into at least two volume portions. At least one passage extends through the partition section and at least one control device is disposed in fluid communication along the passage. The control device substantially fluidically isolates the two volume portions under conditions of use below a predetermined differential pressure threshold. The control device permits fluid communication between the two volume portions under conditions of use in which the predetermined pressure threshold is exceeded. Gas spring assemblies including such an end (Continued)

member assembly as well as suspension systems and methods of manufacture are also included.

20 Claims, 13 Drawing Sheets

(51) Int. Cl.
*F16F 9/04* (2006.01)
*B60G 17/048* (2006.01)
*B60G 17/052* (2006.01)
*F16F 9/34* (2006.01)
*F16F 9/512* (2006.01)

(52) U.S. Cl.
CPC .......... *B60G 17/0528* (2013.01); *F16F 9/049* (2013.01); *F16F 9/0454* (2013.01); *F16F 9/34* (2013.01); *F16F 9/5126* (2013.01); *B60G 2202/152* (2013.01); *B60G 2206/424* (2013.01); *B60G 2206/80* (2013.01); *B60G 2400/25* (2013.01); *B60G 2500/201* (2013.01); *B60G 2800/162* (2013.01); *F16F 2222/126* (2013.01); *F16F 2226/04* (2013.01); *F16F 2228/066* (2013.01); *F16F 2230/06* (2013.01); *F16F 2230/183* (2013.01)

(58) Field of Classification Search
CPC ............ F16F 2228/066; F16F 2230/06; F16F 2226/04; F16F 2230/183; B60G 2400/25; B60G 2202/152; B60G 2206/424; B60G 11/27; B60G 2500/201; B60G 2800/162; B60G 2206/80
See application file for complete search history.

(56) References Cited

U.S. PATENT DOCUMENTS

| | | | |
|---|---|---|---|
| 9,039,020 B2* | 5/2015 | Ratz | B60G 11/27 267/122 |
| 9,120,363 B2 | 9/2015 | Leonard | |
| 9,156,326 B2 | 10/2015 | Koeske | |
| 9,446,648 B2* | 9/2016 | Allen | B60G 11/62 |
| 2003/0015830 A1* | 1/2003 | Miller | B60G 15/08 267/140.11 |
| 2006/0226586 A1* | 10/2006 | Levy | B60G 11/28 267/64.27 |
| 2011/0115139 A1* | 5/2011 | Moulik | B60G 15/14 267/64.23 |
| 2012/0200020 A1* | 8/2012 | Peeters | B60G 11/27 267/122 |
| 2014/0070468 A1* | 3/2014 | Leonard | B60G 11/27 267/64.27 |
| 2014/0167337 A1* | 6/2014 | Ramsey | F16F 9/057 267/124 |
| 2015/0008627 A1* | 1/2015 | Leonard | F16F 7/09 267/64.24 |
| 2015/0130146 A1* | 5/2015 | Moulik | B60G 17/0521 280/6.157 |
| 2016/0121682 A1* | 5/2016 | Leonard | F16F 9/04 280/124.161 |
| 2016/0236532 A1* | 8/2016 | Moulik | F16F 9/05 |

* cited by examiner

END MEMBER ASSEMBLIES AS WELL AS GAS SPRING ASSEMBLIES, SUSPENSION SYSTEMS AND METHODS INCLUDING SAME

This application is a National Stage of International Application No. PCT/US2015/062795, filed on Nov. 25, 2015, which claims the benefit of priority from U.S. Provisional Patent Application No. 62/085,212, filed on Nov. 26, 2014, the subject matter of each of which is hereby incorporated herein by reference in its entirety.

BACKGROUND

The subject matter of the present disclosure broadly relates to the art of gas spring devices and, more particularly, to end member assemblies capable of providing pressurized gas damping through the use of a plurality of gas damping chambers together with one or more gas damping passages and/or control devices. Gas spring assemblies including such an end member assembly as well as suspension systems and methods of manufacture are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and gas damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired kinetic inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Generally, it is possible to reduce the spring rate of gas springs, thereby improving ride comfort, by increasing the volume of pressurized gas operatively associated with the gas spring. This is commonly done by placing an additional chamber, cavity or volume filled with pressurized gas into fluid communication with the primary spring chamber of the gas spring.

Additionally, the one or more damping elements can, in some cases, be of a type and kind that utilize gaseous fluid rather than liquid as the working medium. In known constructions, the pressurized gas damping element can permit gas flow between two or more volumes of pressurized gas, such as through one or more orifices or through one or more valve ports. Generally, there is some resistance to the movement of pressurized gas through these passages or ports. This resistance acts to dissipate energy associated with gas springs and/or suspension systems, and thereby provide some measure of damping.

However, various disadvantages exist with known gas spring constructions that include additional gas volumes to assist in reducing the spring rate of the gas spring. In some cases, these disadvantages involve the movement of air between the two volumes to provide the desired damping performance. Additionally, or in the alternative, such disadvantages can include issues relating to manufacturability, assembly and/or cost of manufacture.

Notwithstanding the overall success of known constructions, certain disadvantages may still exist that could be limiting to broader adoption and/or use of gas spring devices. Accordingly, it is believed desirable to develop gas spring devices that overcome the foregoing and/or other problems and/or disadvantages of known designs, and/or otherwise advance the art of gas spring devices.

BRIEF SUMMARY

One example of a gas spring end member assembly in accordance with the subject matter of the present disclosure can be dimensioned for securement to an associated end of an associated flexible spring member. Such a gas spring end member assembly can include a first end member section that can include a first section wall extending radially outward to an outer peripheral edge. A second end member section can include a second section wall that has an outer surface dimensioned such that the associated flexible spring member can form a rolling lobe therealong. The second end member can be secured to the first end member such that an end member chamber is defined therebetween. An end member partition section can be disposed between the first and second end member sections. The end member partition can separate the end member chamber into at least a first chamber portion disposed toward the first end member section and a second chamber portion disposed toward the second end member section with a passage extending through the end member partition. A control device can be disposed in fluid communication along the passage in the end member partition section. The control device can be operative between a first condition and a second condition. In the first condition, the first and second end member chambers are fluidically isolated from one another through the passage by the control device while differential pressure conditions across the control device are at or below a predetermined pressure threshold. In the second condition, the first and second end member chambers are disposed in fluid communication with one another through the passage and through the control device while differential pressure conditions across the control device exceed the predetermined pressure threshold.

One example of a gas spring assembly in accordance with the subject matter of the present disclosure can be dimensioned for securement between associated sprung and unsprung masses. Such a gas spring assembly can include a flexible spring member that includes a flexible wall and extends between opposing first and second ends. An end member can be secured across the first end of the flexible spring member. An end member assembly according to the foregoing paragraph can be secured across the second end of the flexible spring member such that a spring chamber is at least partially defined therebetween.

One example of a suspension system in accordance with the subject matter of the present disclosure can include a pressurized gas system including a pressurized gas source and a control device. The suspension system can also include at least one gas spring assembly according to the foregoing paragraph disposed in fluid communication with the pressurized gas system.

One example of a method of assembling a gas spring assembly in accordance with the subject matter of the present disclosure can include providing a first end member section that includes a first section wall extending radially outward to an outer peripheral edge. The method can also include providing a second end member section that includes a second section wall with an outer peripheral edge. The method can further include securing the first and second end member sections to one another along the outer peripheral edges thereof such that an end member volume is defined therebetween. The method can further include providing an end member partition section that includes a partition section wall with a passage extending therethrough, and positioning the end member partition section between the first and second end member sections and thereby separating the end member volume into at least first and second end member chambers. The method can also include providing a control device operatively displaceable between a first operative condition and a second operative condition. The method can still further include connecting the control device in fluid communication along the passage through the end member partition section such that: under differential pressure conditions at or below a predetermined pressure threshold, the control device is in the first operative condition in which the first and second end member chambers are fluidically isolated from one another through the passage; and, under differential pressure conditions exceeding the predetermined pressure threshold, the control device is in the second operative condition in which the first and second end member chambers are disposed in fluid communication with one another through the passage.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and ease of understanding.

Figure 1:
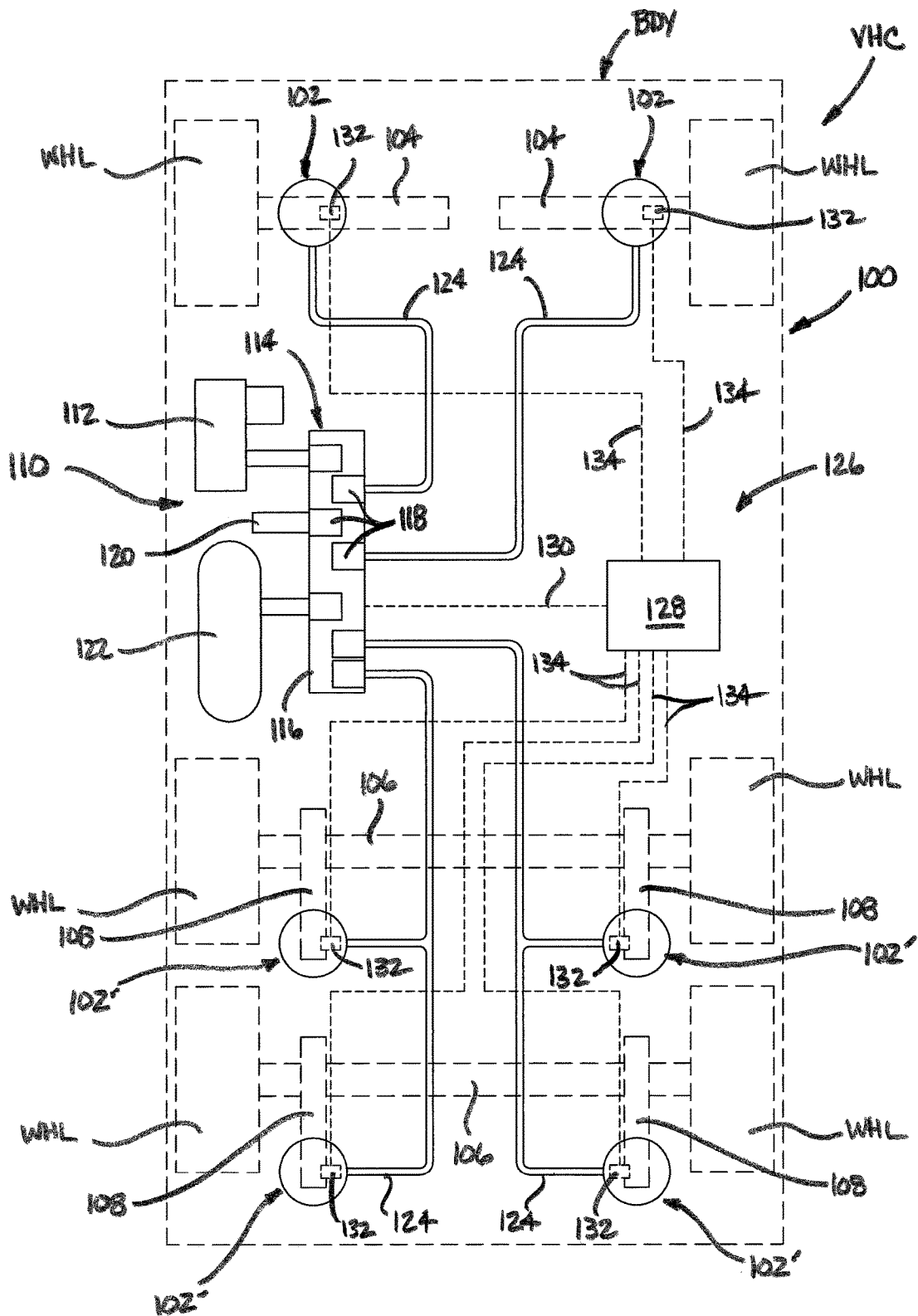
FIG. 1 is a schematic representation of one example of a suspension system of an associated vehicle that includes one or more gas spring assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated wheel-engaging member or axle, for example, of an associated vehicle VHC. It will be appreciated that any such suspension systems can include any number of one or more systems, components and/or devices, and that the same can be operatively connected between the sprung and unsprung masses of the associated vehicle in any suitable manner. For example, such suspension systems can include a plurality of damping members (not shown), which can be operatively connected between the sprung and unsprung masses of the associated vehicle in any suitable manner. In a preferred arrangement, however, suspension system 100 can include one or more gas spring assemblies that are capable of providing pressurized gas damping. In such cases, the one or more gas spring assemblies will preferably be sized, configured and operative to provide the desired performance characteristics for the suspension system without the use of additional damping members (e.g., conventional struts or shock absorbers) that would otherwise be separately provided.

As such, suspension systems can include a plurality of gas spring assemblies that are supported between the sprung and unsprung masses of associated vehicle VHC. In the construction shown in FIG. 1, suspension system 100 includes six gas spring assemblies, one or more of which is disposed toward each corner of the associated vehicle adjacent a corresponding wheel WHL thereof. It will be appreciated, however, that any other suitable number of gas spring assemblies could alternately be used and/or that such gas spring assemblies can be disposed in any other suitable configuration and/or arrangement. In the exemplary arrangement schematically represented in FIG. 1, a plurality of gas spring assemblies 102 are operatively connected between the sprung and unsprung masses of the vehicle with two of gas spring assemblies 102 operatively associated with front wheel-engaging members 104 of vehicle VHC and the remaining gas spring assemblies 102' operatively associated with rear wheel-engaging members 106 of vehicle VHC. In particular, rear wheel-engaging members 106 are shown as including trailing arms 108 that are operatively connected to the rear wheel-engaging members with gas spring assemblies 102' operatively disposed between a trailing arm and the sprung mass (e.g., body BDY) of the vehicle. It will be appreciated, however, that other suitable arrangements and/or configurations could alternately be used.

Suspension system 100 can also optionally include a pressurized gas system 110 that is operatively associated with the gas spring assemblies for selectively supplying pressurized gas (e.g., air) thereto and selectively transferring pressurized gas therefrom. In the exemplary embodiment shown in FIG. 1, pressurized gas system 110 includes a pressurized gas source, such as a compressor 112, for example, for generating pressurized air or other gases. The pressurized gas system can also include any number of one or more control devices of any suitable type, kind and/or construction that may be capable of permitting and/or preventing the selective transfer of pressurized gas. For example, a valve assembly 114 is shown as being in communication with compressor 112 and can be of any suitable configuration or arrangement. In the exemplary embodiment shown, valve assembly 114 includes a valve block 116 with a plurality of valves 118 supported thereon. Valve assembly 114 can also optionally include a suitable exhaust, such as a muffler 120, for example, for venting pressurized gas from the system. Optionally, pressurized gas system 110 can also include a reservoir 122 in fluid communication with valve assembly 114 and suitable for storing pressurized gas for an extended period of time, such as hours, days, weeks or months, for example.

The one or more control devices, such as valve assembly 114, for example, can be in communication with gas spring assemblies 102 and/or 102' in any suitable manner, such as, for example, through suitable gas transmission lines 124. As such, pressurized gas can be selectively transferred to and/or from the gas springs through valve assembly 114, such as to alter or maintain vehicle height at one or more corners of the vehicle, for example.

Suspension system 100 also includes a control system 126 that is capable of communication with any one or more other systems and/or components (not shown) of suspension system 100 and/or of vehicle VHC, and is capable of selective operation and control of the suspension system. Control system 126 includes a controller or electronic control unit (ECU) 128 in communication with compressor 112 and/or valve assembly 114, such as through a suitable conductor or lead 130, for example, for selective operation and control thereof, including supplying and exhausting pressurized gas to and from any number of one or more gas spring assemblies, such as gas spring assemblies 102, for example. Additionally, it will be appreciated that controller 128 can be of any suitable type, kind and/or configuration.

Control system 126 can also optionally include one or more height or distance sensing devices 132 as well as any other desired systems and/or components. Height sensors 132, if provided, can be communicatively coupled with controller 128 in any suitable manner, such as by way of conductors or leads 134, for example. The height sensors are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves WVS (FIG. 3), for example.

Having described an example of a suspension system (e.g., suspension system 100) that can include one or more gas spring assemblies in accordance with the subject matter of the present disclosure, an example of such a gas spring assembly will now be described in connection with FIGS. 2, 3 and 3A. As shown therein, a gas spring assembly 200, such as may be suitable for use as one of gas spring assemblies 102 and/or 102' in FIG. 1, for example, can have a longitudinally-extending axis AX and can include one or more end members, such as an end member 202 and an end member assembly 204 (which may, in some cases, be alternately referred to herein simply as an "end member") that is spaced longitudinally from end member 202. A flexible spring member 206 can extend peripherally around axis AX and can be secured between the end member and the end member assembly in a substantially fluid-tight manner such that a spring chamber 208 is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIG. 2, for example, end member 202 can be secured along a first or upper structural component USC, such as associated vehicle body BDY in FIG. 1, for example, and can be secured thereon in any suitable manner. Additionally, in the arrangement shown in FIG. 2, for example, end member assembly 204 can be secured on or along a second or lower structural component LSC, such as one of associated trailing arms 108 in FIG. 1, for example.

Figure 2:
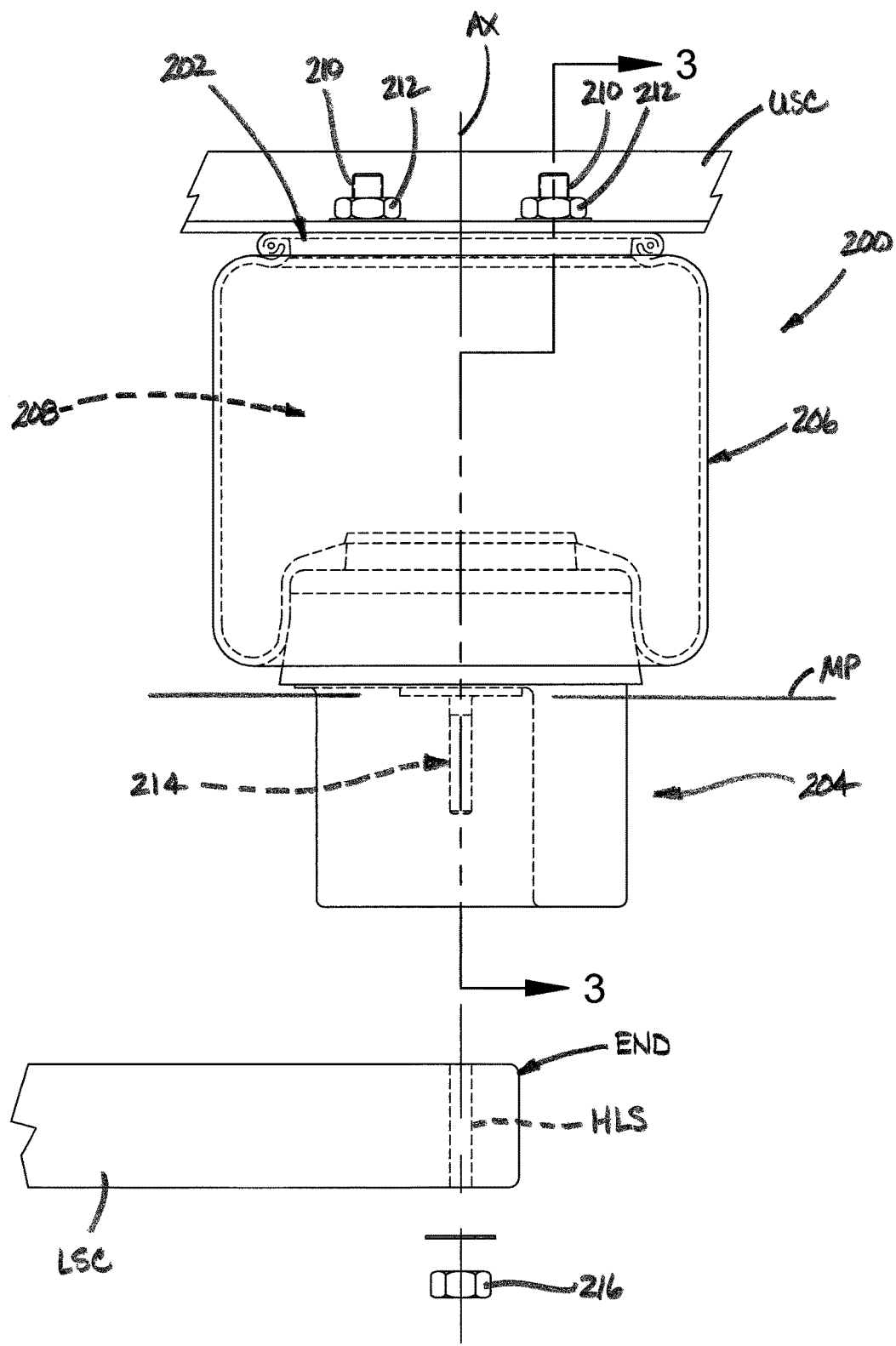
FIG. 2 is a side view of one example of a gas spring assembly in accordance with the subject matter of the present disclosure prior to securement on an associated structural component.

In the arrangement shown in FIG. 2, lower structural component LSC can be pivotally or otherwise attached to upper structural component USC such that the structural components can move relative to one another about a joint or other similar feature. During use, lower structural component LSC is displaced between compressed or jounce conditions and extended or rebound conditions, as is well understood by those of skill in the art. As the associated structural components are displaced relative to one another in a jounce direction, it will be recognized and appreciated that gas spring assembly 200 is compressed. Conversely, as the associated structural components are displaced relative to one another in a rebound direction, the gas spring assembly in FIG. 2 is extended.

It will be appreciated that the movement of the associated structural components relative to one another, as described above, can be due to variations in load conditions and/or result from road inputs and/or other impact conditions (e.g., jounce conditions), as is well understood by those of skill in the art. Additionally, it will be recognized and appreciated by those of skill in the art that gas spring assembly 200 and/or components thereof will typically move relative to one another through a curvilinear, rotational, arcuate, angular or other non-linear manner.

End member 202 and end member assembly 204 can be secured on or along a corresponding one of upper and lower structural components USC and LSC in any suitable manner. For example, one or more securement features can be included along end member 202. In some cases, the one or more securement features, such as securement devices 210, which can take the form of threaded mounting studs, for example, can project outwardly from the end member and can be secured on or along the structural component in a suitable manner. For example, securement devices 210 can extend through openings or mounting holes HLS in upper structural component USC and can be secured thereto, such as by way of one or more securement devices 212 (e.g., threaded nuts). In other cases, one or more securement features, such as threaded passages, for example, can extend into the end member. In such cases, the threaded passages, which can be blind passages and/or through passages, can be dimensioned to receive a corresponding securement device, such as threaded fasteners, for example, which can extend through one or more holes (not shown) in the structural component and into engagement with one of the threaded passages.

As another example, one or more securement features can be included along end member assembly 204. In some cases, the one or more securement features can extend into the end member assembly, such as in the form of threaded passages, for example. In such case, the threaded passages, which can be blind passages and/or through passages, can be dimensioned to receive a corresponding securement device, such as threaded fasteners, for example, which can extend through one or more holes (not shown) in the structural component and into engagement with the threaded passages. In other cases, the one or more securement features can project outwardly from along the end member assembly or a wall portion thereof. As one example, a securement feature 214, such as in the form of a threaded mounting stud, for example, can project outwardly from along a mounting surface or plane MP of end member assembly 204. Securement feature 214 can be received within a mounting hole HLS extending through lower structural component LSC. End member assembly 204 can be secured on or along lower structural component LSC in a suitable manner, such as, for example, by way of one or more securement devices 216 (e.g., threaded nuts) engaging securement feature 214, for example.

Additionally, a fluid communication port, such as a transfer passage 218 (FIG. 3), for example, can optionally be provided to permit fluid communication with spring chamber 208, such as may be used for transferring pressurized gas into and/or out of the spring chamber, for example. In the exemplary embodiment shown, transfer passage 218 extends through end member 202 through securement device 210 and is in fluid communication with spring chamber 208. It will be appreciated, however, that any other suitable fluid communication arrangement could alternately be used.

Flexible spring member 206 can be of any suitable size, shape, construction and/or configuration. Additionally, the flexible spring member can be of any suitable type and/or kind. Flexible spring member 206 is shown in FIGS. 2, 3, 3A and 4-7 as being of an elongated sleeve-like design and can include a flexible wall 220 that can be formed in any suitable manner and from any suitable material or combination of materials, such as by using one or more fabric-reinforced, elastomeric plies or layers and/or one or more un-reinforced, elastomeric plies or layers, for example. Typically, two or more fabric-reinforced, elastomeric plies and two or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 220 can extend in a generally longitudinal direction between opposing ends 222 and 224. Additionally, flexible wall 220 can include an outer surface 226 and an inner surface 228, the latter of which can at least partially define spring chamber 208. In some cases, flexible wall 220 can be constructed from a plurality of layers or plies, such as an outer or cover ply that at least partially forms outer surface 226 and an inner or liner ply that at least partially forms inner surface 228. In some cases, flexible wall 220 can further include one or more reinforcing plies disposed between the outer and inner surfaces. It will be appreciated that any such reinforcing plies, if included, can be of any suitable construction, configuration and/or arrangement. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Additionally, it will be appreciated that flexible spring member 206 can be operatively connected between end member 202 and end member assembly 204 in any suitable manner and that any suitable combination of features and/or components can be included on or along end member 202, end member assembly 204 and/or flexible spring member 206. As one example, flexible spring member 206 can, optionally, include a mounting bead disposed along either one or both of ends 222 and 224 of flexible wall 220. As identified in FIG. 3, for example, mounting beads 230 and 232 are shown as being respectively disposed along ends 222 and 224. In some cases, the mounting beads can, optionally, include a reinforcing element, such as an endless, annular bead wire 234, for example.

It will be appreciated that the one or more end members can be of any suitable type, kind, construction and/or configuration. Additionally, it will be appreciated that the one or more end members can be formed from any suitable number of one or more elements and/or components. Furthermore, it will be appreciated that the one or more end members can include any suitable number of one or more walls and/or wall portions, and that the one or more end members can be operatively connected or otherwise secured to the flexible spring member in any suitable manner.

Figure 3:
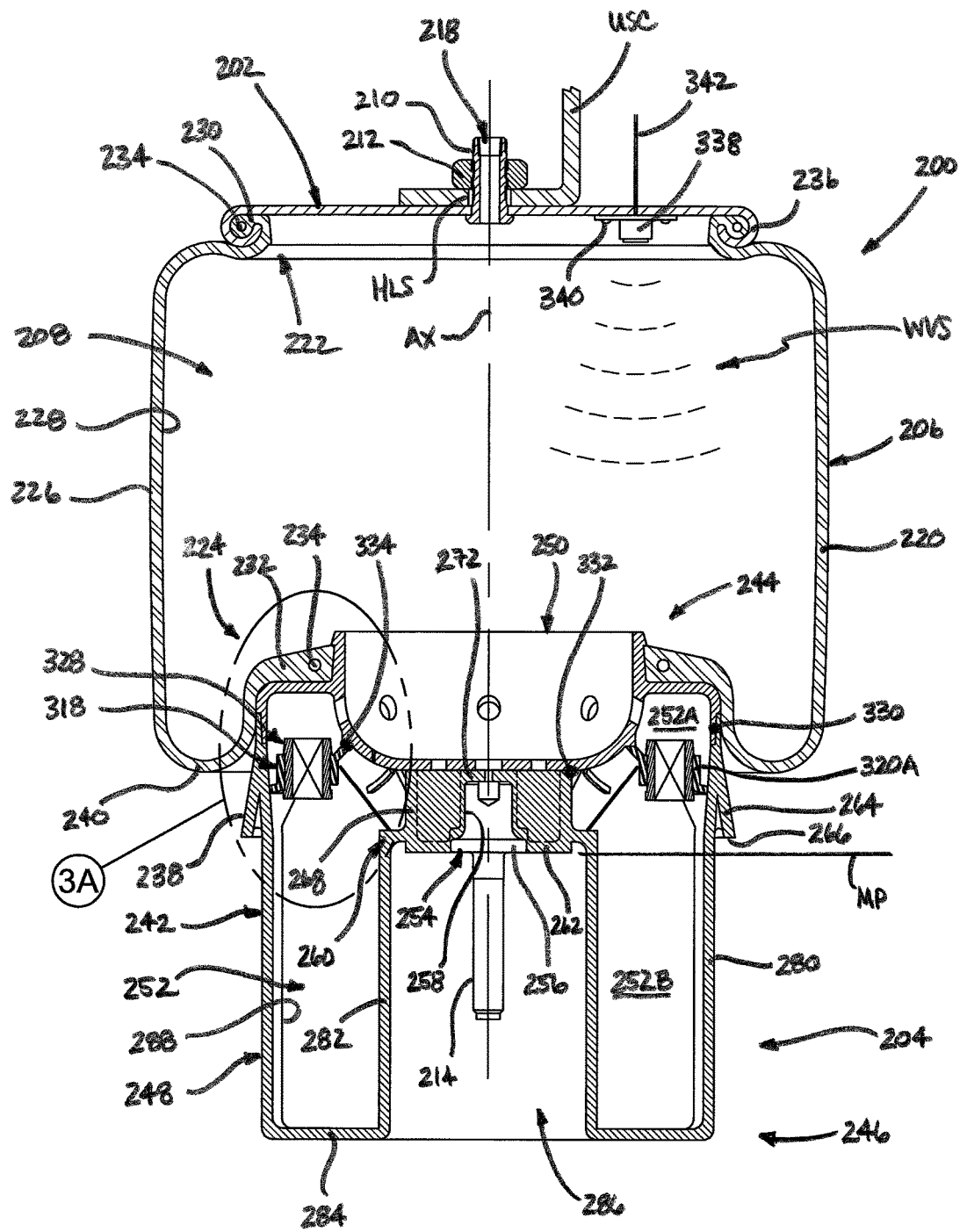
FIG. 3 is a cross-sectional side view of the gas spring assembly in FIG. 2 taken from along line 3-3 therein.
Figure 3A:
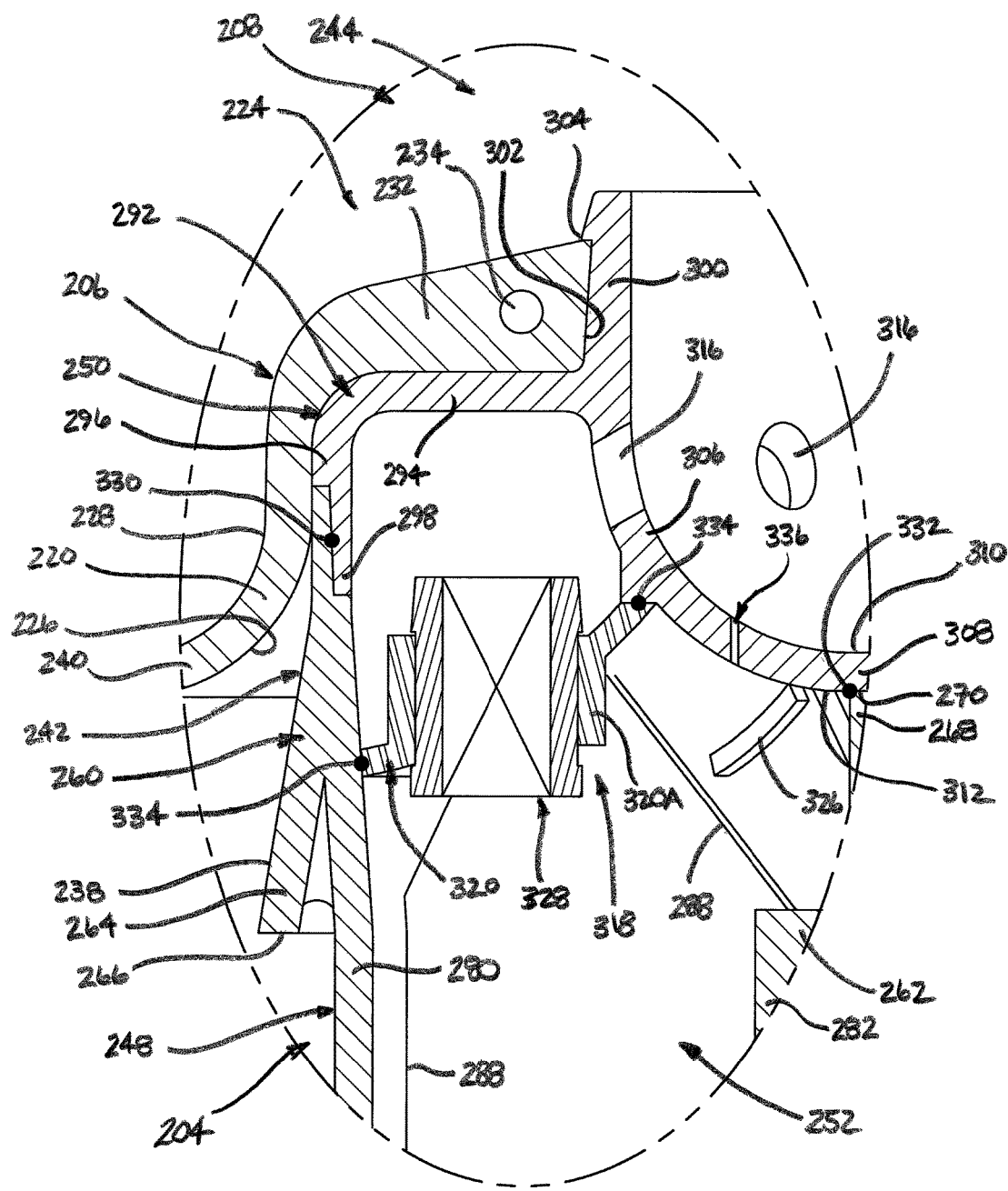
FIG. 3A is a greatly enlarged view of the portion of the exemplary gas spring assembly in FIGS. 2 and 3 that is identified as Detail 3A in FIG. 3.
Figure 4:
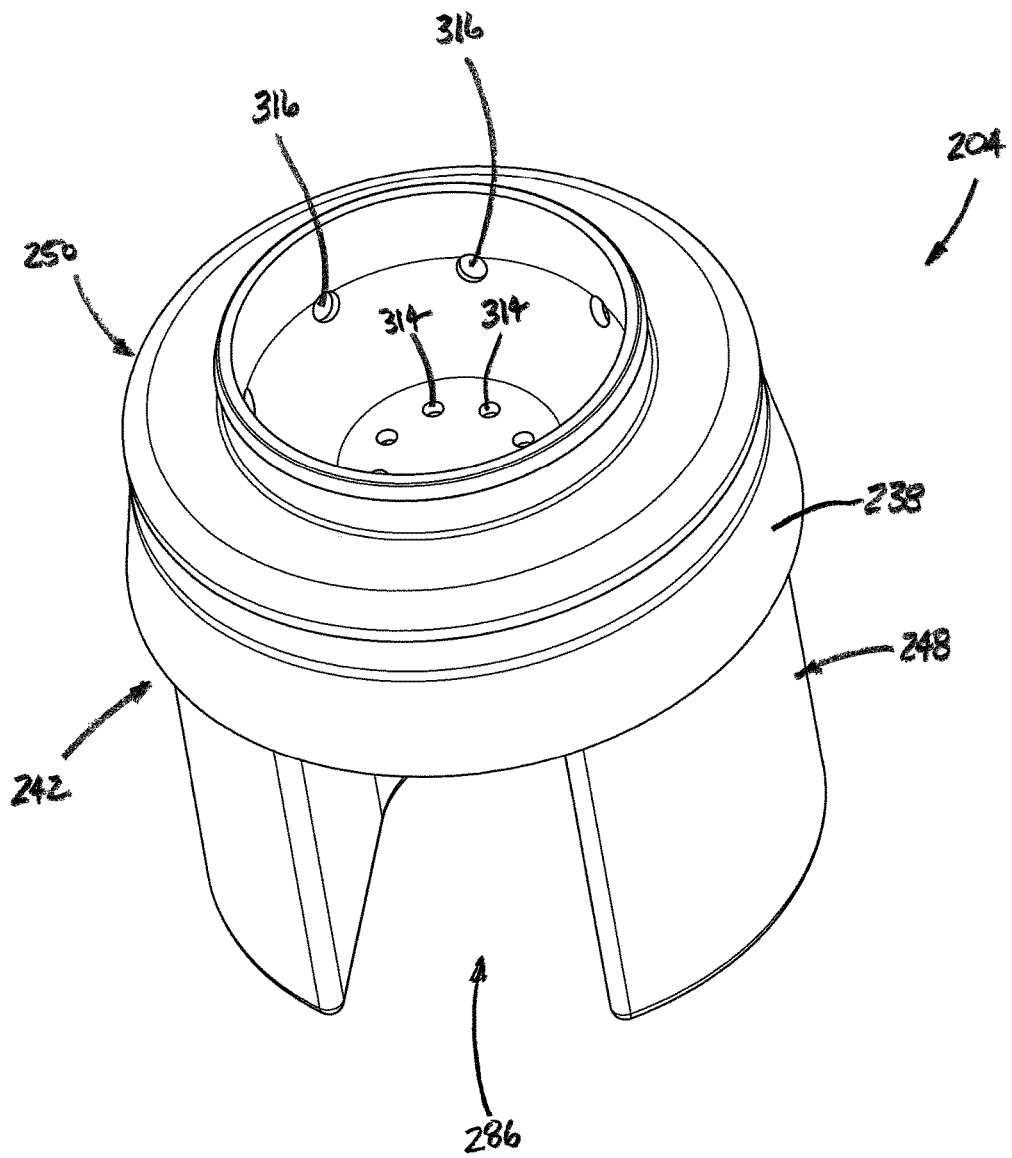
FIG. 4 is a top perspective view of one example of an end member assembly in accordance with the subject matter of the present disclosure suitable for use in forming the gas spring assembly in FIGS. 2, 3 and 3A.
Figure 5:
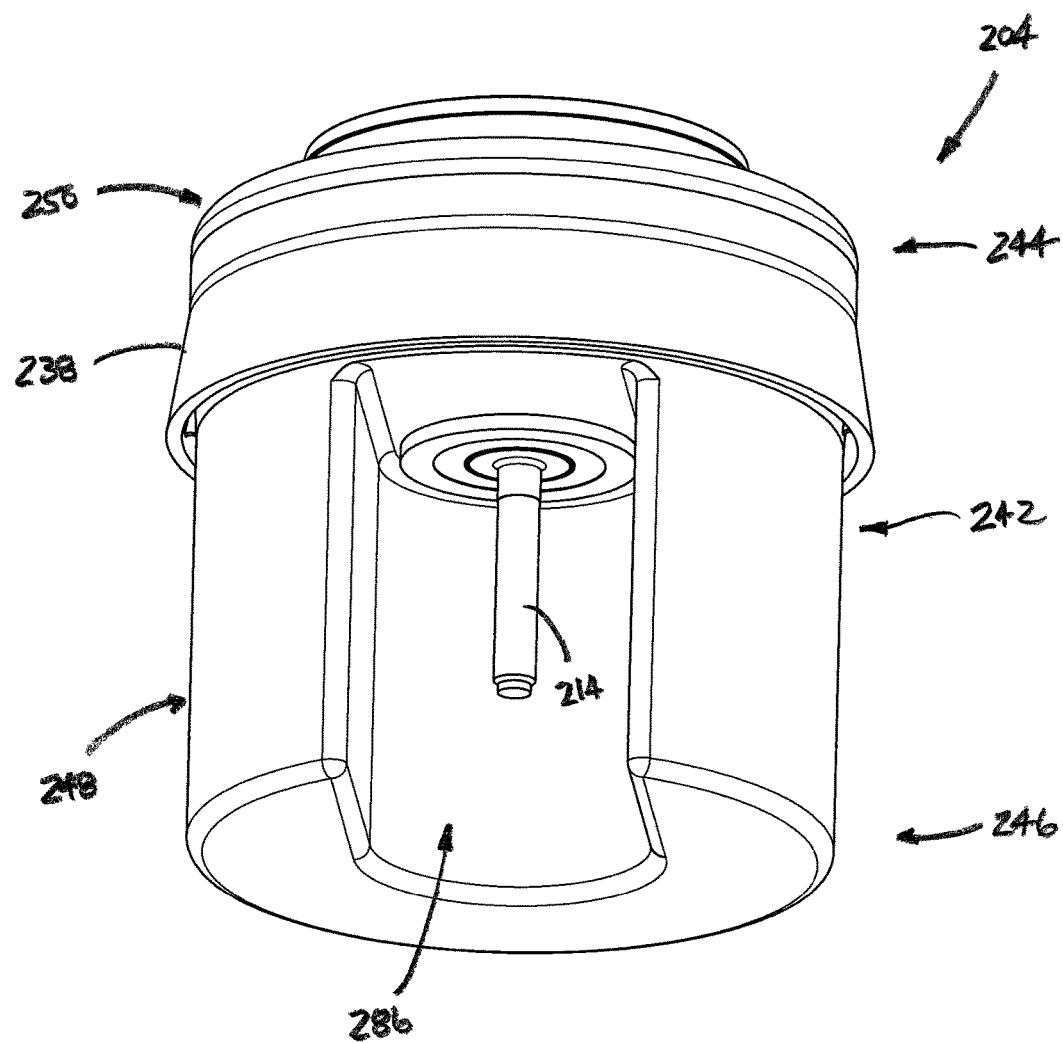
FIG. 5 is a bottom perspective view of the end member assembly shown in FIGS. 2-4.
Figure 6:
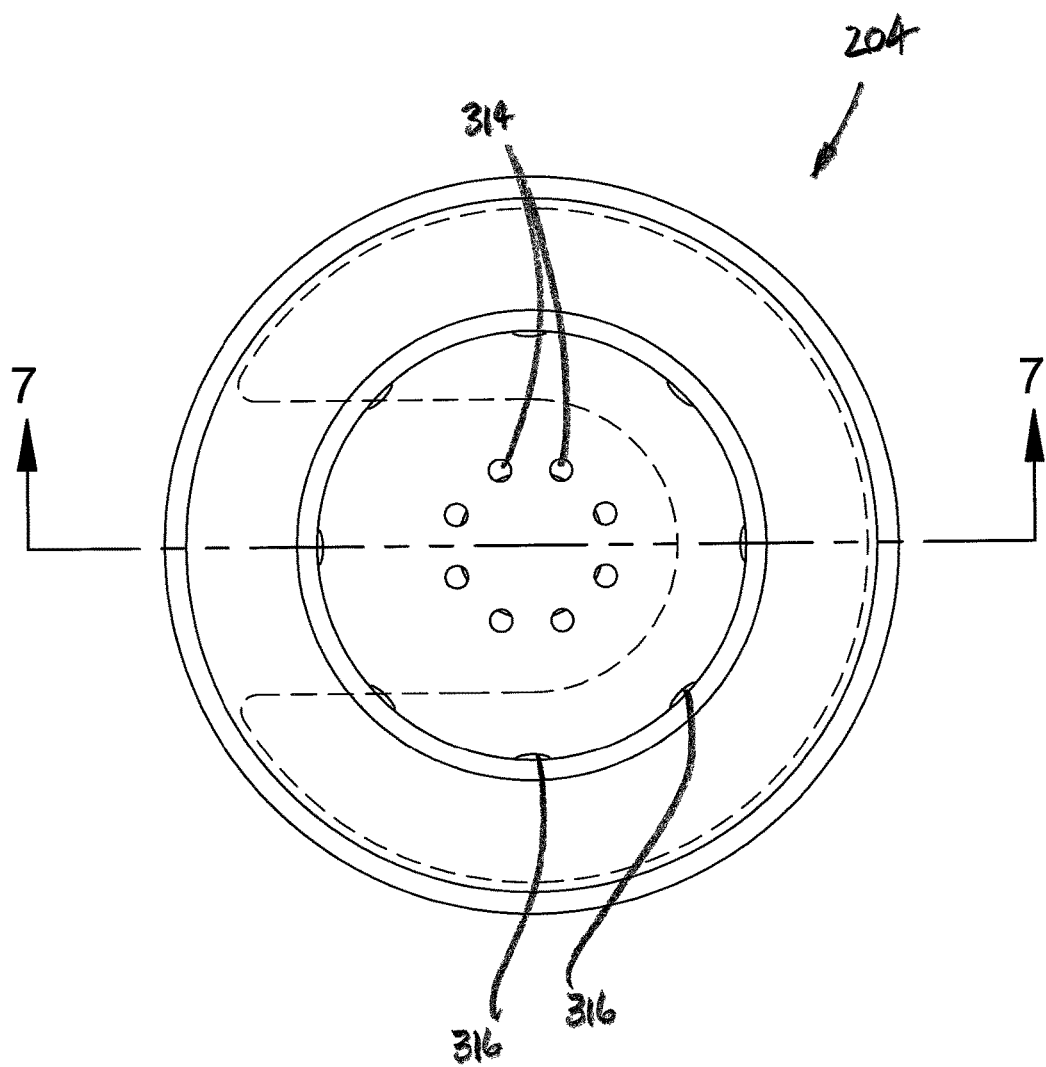
FIG. 6 is a top plan view of the end member assembly shown in FIGS. 2-5.
Figure 7:
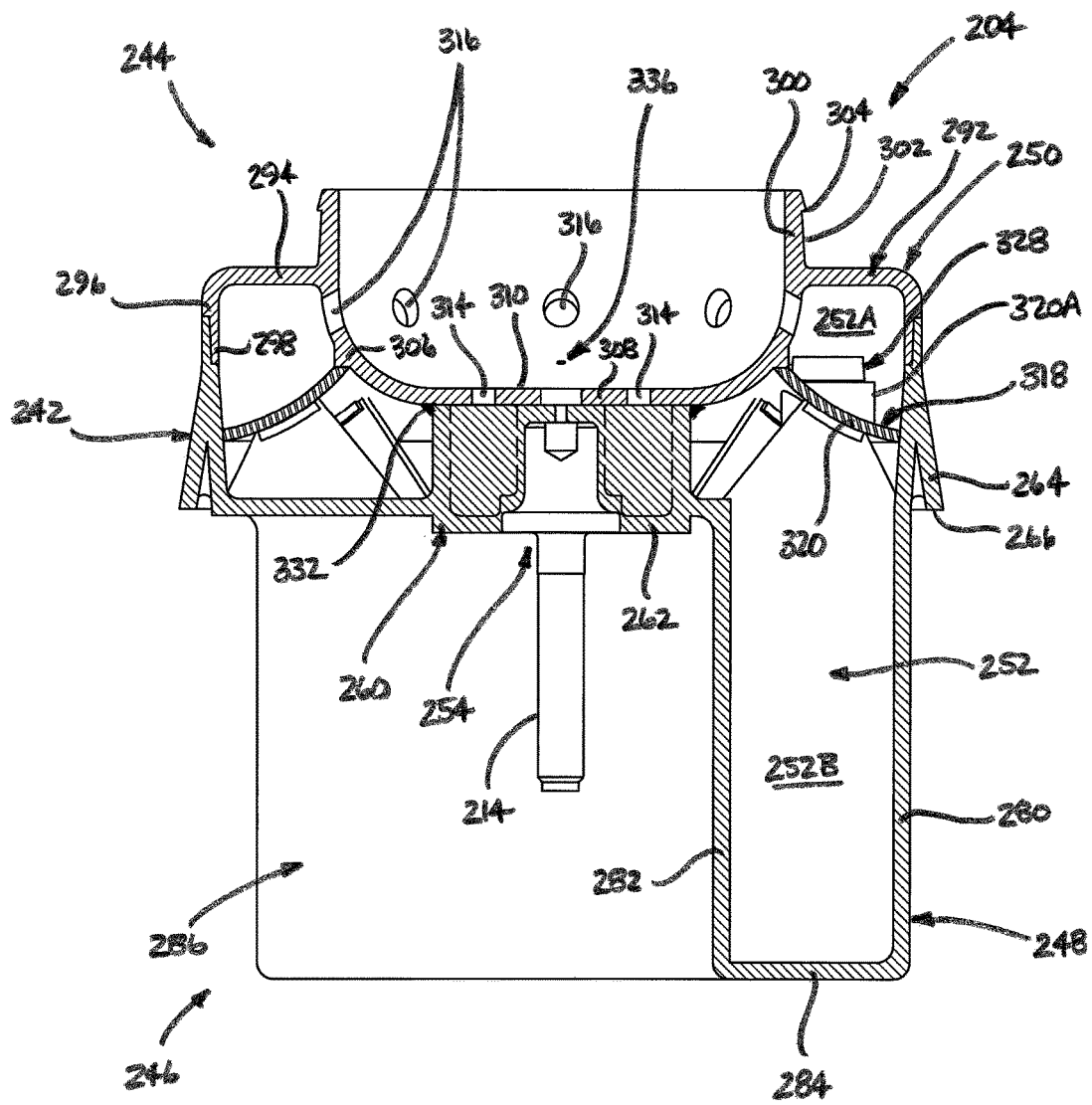
FIG. 7 is a cross-sectional side view of the end member assembly in FIGS. 2-6 taken from along line 7-7 in FIG. 6.
Figure 8:
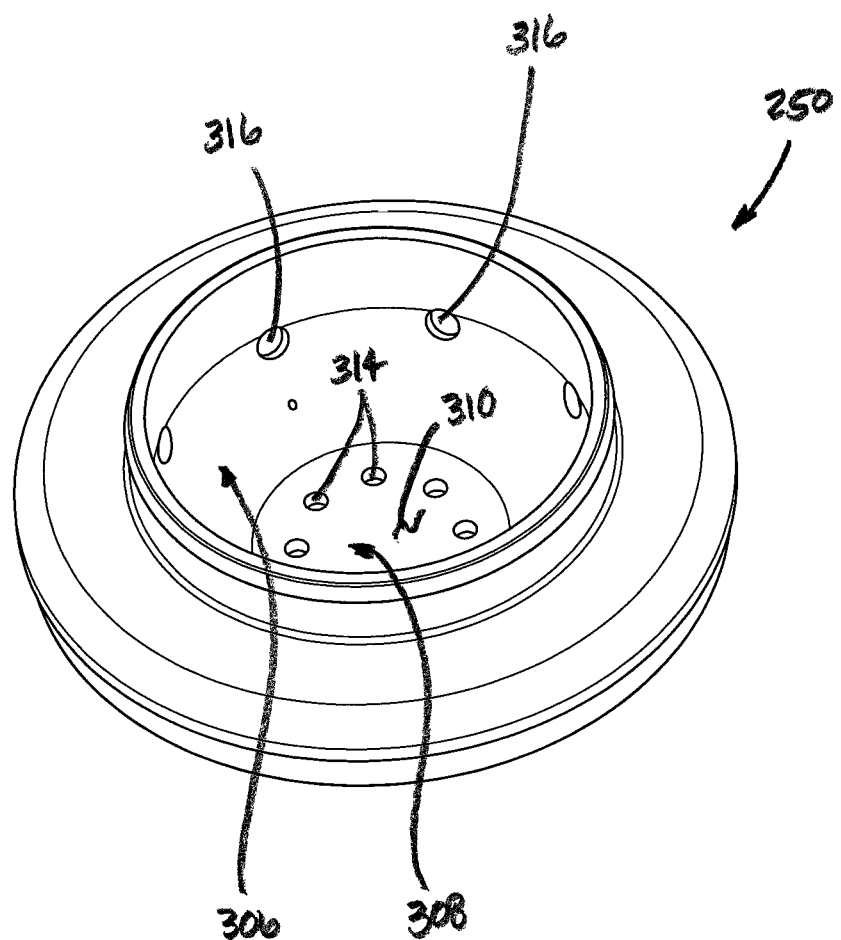
FIG. 8 is a top perspective view of one example of an end member section suitable for use in forming the end member assembly in FIGS. 2-7.
Figure 9:
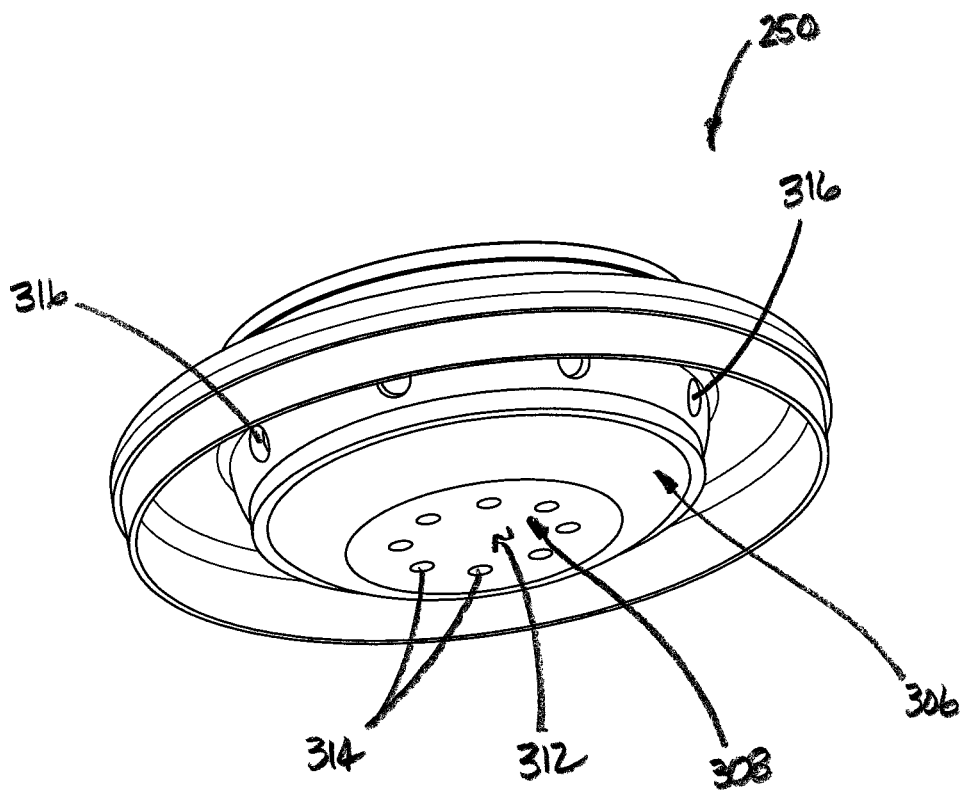
FIG. 9 is a bottom perspective view of the end member section in FIGS. 2-8.

In the exemplary arrangement shown in FIGS. 2, 3 and 3A, for example, end member 202 is of a type commonly referred to as a bead plate that is secured to end 222 of flexible spring member 206, such as by crimping or otherwise deforming an outer peripheral portion 236 of end member 202 to form a substantially fluid-tight, crimped-edge connection with mounting bead 230 along end 222 of flexible spring member 206.

In the exemplary arrangement shown in FIGS. 2, 3, 3A and 4-7, for example, end member assembly 204 is shown as being of a type commonly referred to as a piston (or a roll-off piston) that has an outer surface 238 that abuttingly engages outer surface 226 of flexible spring member 206 such that a rolling lobe 240 is formed therealong. As gas spring assembly 200 is displaced between extended and collapsed conditions, rolling lobe 240 is displaced along outer surface 238 in a conventional manner.

As identified in FIGS. 2, 3, 3A and 4-7, end member assembly 204 includes an end member body 242 and extends from along a first or upper end 244 toward a second or lower end 246 that is spaced longitudinally from end 244. Body 242 includes a first end member section (or base section) 248 and a second end member section (or cap section) 250 that are secured together and at least partially define an end member volume 252. End member assembly 204 can also include at least one connector fitting 254 that is at least partially embedded within the end member assembly and accessible from along at least one of ends 244 and 246. In such case, the at least one connector fitting can be at least partially embedded in at least one of base section 248 and cap section 250 of end member body 242.

In a preferred arrangement, connector fitting 254 can be accessible from along end 246 and can include securement feature 214 that projects axially outward from along mounting plane MP. In the construction shown in FIGS. 2, 3, 3A and 4-7, for example, only one connector fitting 254 is included. It will be appreciated, however, that two or more connector fittings could alternately be used in other constructions. Connector fitting 254 can include a fitting body 256 with an outer surface 258 that is at least partially embedded within one or more walls and/or wall portions of the at least one section of the end member body.

In some cases, outer surface 258 and/or any other external features of connector fitting 254 can include one or more features, characteristics and/or surface treatments suitable for promoting adhesion, retention and/or engagement of the material of end member body 242 with connector fitting 254. Non-limiting examples of such features, characteristics and/or surface treatments can include any combination of annular grooves, annular ridges, one or more helical threads, knurl patterns, chemical adhesives, and/or bonding/sizing agents.

Base section 248 of end member body 242 can include a base section wall 260 with an end wall portion 262 disposed between ends 244 and 246 that is oriented transverse to axis AX and at least partially defines mounting plane MP. In a preferred arrangement, end wall portion 262 is dimensioned to abuttingly engage a surface of lower structural component LSC. Base section wall 260 can also include an outer side wall portion 264 that is disposed radially outward of end wall portion 262 and extends toward an outer distal edge 266. In a preferred arrangement, outer side wall portion 264 extends peripherally about axis AX and at least partially defines outer surface 238 as an endless annular surface along which rolling lobe 240 can be displaced.

Figure 10:
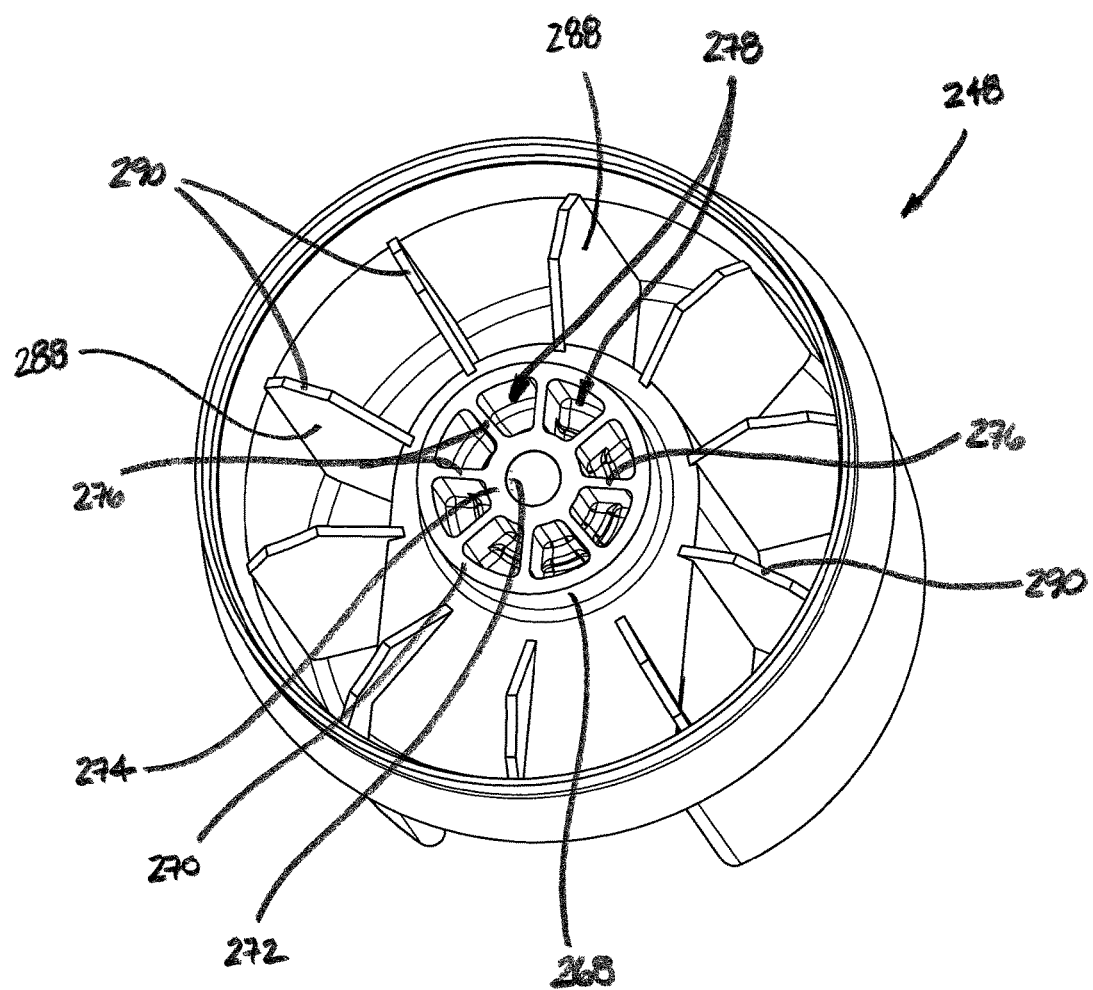
FIG. 10 is a top perspective view of another example of an end member section suitable for use in forming the end member assembly in FIGS. 2-7 and cooperative with the end member section in FIGS. 8 and 9.
Figure 11:
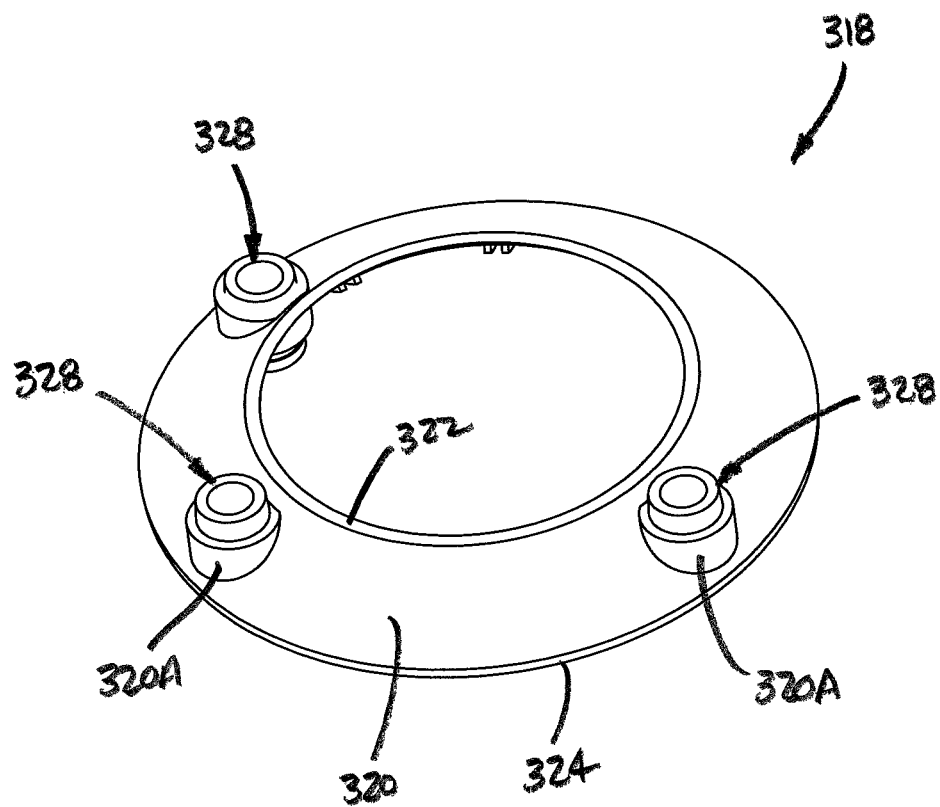
FIG. 11 is a top perspective view of one example of an end member partition assembly suitable for use in forming the end member assembly in FIGS. 2-7.
Figure 12:
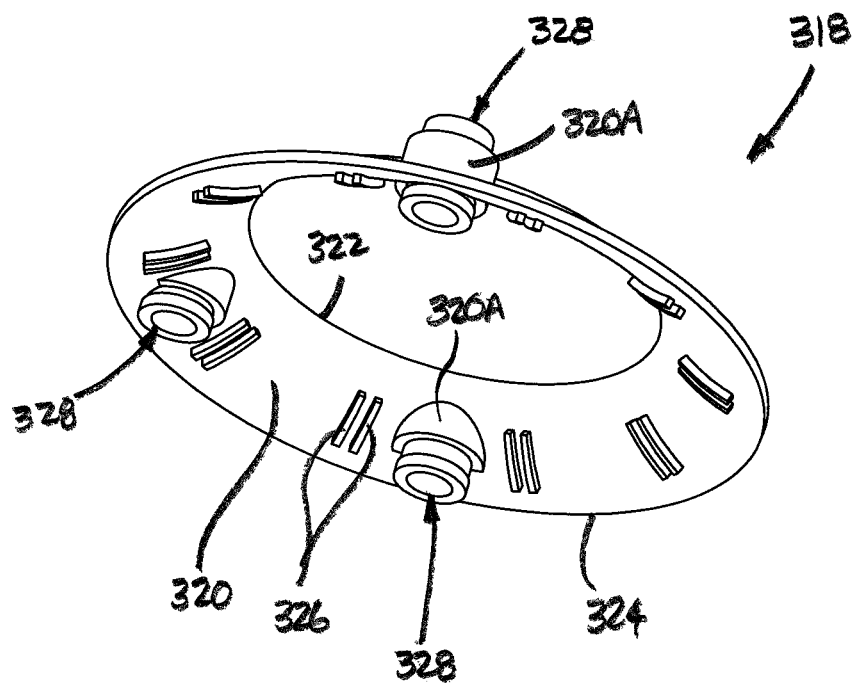
FIG. 12 is a bottom perspective view of the end member partition assembly in FIGS. 2-7 and 11.

Base section wall 260 can further include an inner side wall portion 268 that is disposed radially inward from outer side wall portion 264. Inner side wall portion 268 can extend from along end wall portion 262 axially toward an inner distal edge 270 (FIGS. 3A and 10). In some cases, base section wall 260 can include a central wall portion 272 that extends axially from along end wall portion 262 to a central distal edge 274. Central wall portion 272 can be spaced radially inward of inner side wall portion 268 such that a cavity (not numbered) can be at least partially defined therebetween. In some cases, the cavity can be an endless annular cavity that has a closed end formed by end wall portion 262 and an open end facing toward end 244. In other cases, base section wall 260 can, optionally, include one or more support wall portions 276 that extend axially from along end wall portion 262 and radially between inner side wall portion 268 and central wall portion 272. In such cases, the cavity can be separated into a plurality of damping chambers 278.

Base section wall 260 can also include one or more walls and/or wall portions that at least partially define end member volume 252. As one example, base section wall 260 can include an outer reservoir wall portion 280 that extends at least partially around axis AX and at least partially defines an outer periphery of end member volume 252. In the exemplary arrangement shown, outer reservoir wall portion 280 can extend axially from along outer side wall portion 264 and radially inward from outer distal edge 266. Base section wall 260 can also include an inner reservoir wall portion 282 that is disposed radially inward of the outer reservoir wall portion and at least partially defines an inner periphery of end member volume 252. Base section wall 260 can further include a reservoir end wall portion 284 that is oriented transverse to axis AX and operatively connects the inner and outer reservoir wall portions to form a closed end of end member volume 252.

Together with end wall portion 262 of base section wall 260, inner reservoir wall portion 282 can at least partially define a recess 286 dimensioned to receive at least a portion of an associated structural component, such as an end END of lower structural component LSC, for example. In such case, it will be appreciated that at least a portion of end member volume 252 will extend below or otherwise axially beyond mounting plane MP and thereby at least partially surround the associated structural component.

In some cases, end member body 242 can also include intermediate reservoir wall portions 288 that can extend axially from along reservoir end wall portion 284 toward end 244 and radially between inner and outer reservoir wall portions 282 and 280. In some cases, the intermediate reservoir wall portions can be integrally formed as portions of base section wall 260. In other cases, the intermediate reservoir wall portions could be provided separately and installed within the end member volume in a suitable manner. In a preferred arrangement, intermediate reservoir wall portions 288 will terminate at a distal end 290 (FIG. 10) opposite reservoir end wall portion 284.

Cap section 250 can include a cap section wall 292 with an end wall portion 294 disposed toward end 244 and oriented transverse to axis AX. Cap section wall can also include an outer side wall portion 296 that extends axially from along end wall portion 294 toward an outer distal edge 298. In some cases, cap section wall 292 can include an inner mounting wall portion 300 that extends axially beyond end wall portion 294 and peripherally about axis AX. Inner mounting wall portion 300 can have an outer surface 302 that is dimensioned to receive end 224 of flexible spring member 206 such that a substantially fluid-tight seal can be formed therebetween. In some cases, a retaining ridge 304 can project radially outward from along the inner mounting wall portion and can extend peripherally along at least a portion thereof, such as may assist in retaining end 224 of flexible spring member 206 in abutting engagement on or along the end member assembly.

Cap section wall 292 can also include a central side wall portion 306 that extends from along end wall portion 294 in an axial direction opposite inner mounting wall portion 300 and transitions to a central end wall portion 308 oriented transverse to axis AX. Central end wall portion 308 includes opposing surfaces 310 and 312 with surface 310 facing toward end 244 and surface 312 facing toward distal edges 270 and 274 of base section wall 260. A plurality of passages 314 can extend through central end wall portion 308 such that damping chambers 278 are in fluid communication with spring chamber 208 therethrough. In a preferred arrangement, passages 314 are of a size and shape such that pressurized gas flow through the passages can generate pressurized gas damping of vibrations and/or other dynamic inputs acting on the gas spring assembly. In a preferred arrangement, such pressurized gas damping can be configured for or otherwise targeted to dissipate vibrations and/or other dynamic inputs having a particular, predetermined natural frequency or within a particular, predetermined range of frequencies.

Additionally, a plurality of passages 316 can extend through central side wall portion 306 such that end member volume 252 can be in fluid communication with spring chamber 208 therethrough. In a preferred arrangement, passages 316 are of a size and shape such that pressurized gas flow through the passages can generate pressurized gas damping of vibrations and/or other dynamic inputs acting on the gas spring assembly. In a preferred arrangement, such pressurized gas damping can be configured for or otherwise targeted to dissipate vibrations and/or other dynamic inputs having a particular, predetermined natural frequency or within a particular, predetermined range of frequencies.

End member assembly 204 also includes a chamber barrier or end member partition section 318 that is interposed between base section 248 and cap section 250. In the arrangement shown in FIGS. 3, 3A and 7, end member partition section 318 separates end member volume into a plurality of damping chambers 252A and 252B. In a preferred arrangement, damping chambers 252A and 278 can be disposed in fluid communication with spring chamber 208 during normal conditions of use of the gas spring assembly, such as to damp or otherwise dissipate inputs of a particular frequency and/or magnitude (or within a particular range of frequencies or range of magnitudes) acting on the gas spring assembly. Under certain other conditions of use, damping chamber 252B can be fluidically introduced to the other damping chambers and to the spring chamber to thereby provide additional performance benefits, such as are described in greater detail hereinafter.

End member partition section 318 can include a partition section wall 320 that extends radially between an inner peripheral edge 322 and an outer peripheral edge 324. In a preferred arrangement, distal end 290 of intermediate reservoir wall portions 288 can have a shape or profile that is complementary to the shape or profile of partition section wall 320. Additionally, end member partition section 318 can optionally include a plurality of ribs 326 formed along partition section wall 320. Ribs 326 can be dimensioned to receive distal ends 290 of the intermediate reservoir wall portions in an assembled condition of the end member assembly.

In some cases, partition section wall 320 can have a curved or otherwise non-linear cross-section shape or profile. Additionally, partition section wall 320 can include one or more passage wall portions 320A that at least partially define a corresponding number of one or more passages (not numbered) can extend through the partition section wall. In some cases, the passages can be of a size and shape such that pressurized gas flow through the passages can generate pressurized gas damping of vibrations and/or other dynamic inputs acting on the gas spring assembly. In a preferred arrangement, such pressurized gas damping can be configured for or otherwise targeted to dissipate vibrations and/or other dynamic inputs having a particular, predetermined natural frequency or within a particular, predetermined range of frequencies. In a preferred arrangement, however, control devices 328 can be disposed in fluid communication across the passages for selectively permitting and inhibiting pressurized gas flow therethrough. In some cases, control devices 328 can take the form of one-way or check valves that separate chambers 252A and 252B under certain conditions of use and allow pressurized gas transfer under other conditions of use.

Base section 248 and cap section 250 are oriented relative to one another such that end member volume 252 is at least partially defined therebetween. End member partition section 318 is interposed between the base section and the cap section and is oriented generally transverse to axis AX. It will be appreciated that base section 248, cap section 250 and/or end member partition section 318 can be secured to one another by way of one or more flowed-material joints, such as are represented in FIGS. 3 and/or 7 by joints 330, 332 and 334, for example.

It will be appreciated that, in some cases, only one of joints 334 may be included. In which case, a preferred arrangement can include a close fit between the unjoined peripheral edge (e.g., one of edges 322 and 324) and the adjacent wall portion (e.g., a corresponding one of outer reservoir wall portion 280 and central side wall portion 306). In this manner, a high resistance to pressurized gas transfer can be generated during highly dynamic events such that pressurized gas is transferred into chamber 252B primarily through control devices 328. However, such a close fit construction will permit high pressure gas contained in chamber 252B to slowly equalize with the pressurized gas in spring chamber 208, chamber 252A and/or chambers 278 once any such highly dynamic event has abated. Alternately, one or more of joints 330, 332 and/or 334 can be included and form substantially fluid-tight connections between adjoined components. In which case, one or more vent passages 336 (only one of which is shown) can extend through one or more portions of cap section wall 292. In a preferred arrangement, such one or more vent passages 336 are sized and constructed such that the vent passages generate significant resistance to pressurized gas flow that would be generated by highly dynamic events. In which case, pressurized gas transfer into chamber 252B will occur through the operation of control devices 328. As such a condition abates, high pressure gas contained within chamber 252B can slowly flow through vent passages 336 until pressure within chamber 252B has at least approximately equalized with the gas pressure in one or more of spring chamber 208, chamber 252A and/or chambers 278.

That is, an exemplary end member assembly in accordance with the subject matter of the present disclosure can include multiple cavities (e.g., three or more) that can function as segregated gas volumes. Two or more of the gas volumes (e.g., damping chambers 278 and/or chamber portion 252A) can be disposed in fluid communication with spring chamber 208 and operative substantially continuously during dynamic use in operation of the gas spring assembly, such as through the transfer of pressurized gas through passages 314 and/or 316, for example. Another gas volume (e.g., chamber portion 252B) can become engaged during highly dynamic events, such as a pothole impact, for example. When such an aggressive road event is encountered, gas spring assemblies 102, 102' and/or 200 can be compressed to a point of achieving a high dynamic pressure that exceeds a predetermined pressure threshold (i.e., a differential pressure threshold).

Under such conditions, one or more of the control devices (e.g., control devices 328) included in fluid communication along the passages through end member partition section 318 open or otherwise actuate as dynamic pressure within the gas spring assembly increases to or above the predetermined pressure threshold. Such an actuation of the control devices allows pressurized gas from spring chamber 208, damping chambers 278 and/or damping chamber portion 252A to enter damping chamber portion 252B. Such operation increases the active volume of the gas spring assembly and thereby reduces the spring rate to soften the impact transmitted to the vehicle. That is, such an action allows the gas spring assembly to recognize a larger volume and to remove some of the potential energy stored in the high pressure/lower volume of the other chamber alone (i.e., spring chamber 208, chamber 252A and/or chambers 278).

In a preferred arrangement, an end member body of an end member assembly in accordance with the subject matter of the present disclosure (e.g., end member body 242 of end member assembly 204) can be at least partially formed from polymeric materials, such as by way of one or more processes that permit the features and elements described above to be integrally formed with other features of the end member assembly. It will be appreciated that the end member assembly can be formed from any suitable material or combination of materials. For example, end member assembly 204 can be at least partially formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

It will be appreciated that flowed-material joints 330, 332 and 334 can be formed in any suitable manner. As such, it will be appreciated that any suitable processes or joining techniques as well as any suitable geometric features corresponding to such processes and/or joining techniques can be used. Non-limiting examples of suitable joining processes and/or techniques can include spin welding, hot plate welding and ultrasonic welding.

A height or distance sensing device 338 is, optionally, shown in FIG. 3 as being disposed within spring chamber 208 along end member 202 and being secured thereto using suitable fasteners 340. Height sensing device 338 can be of any suitable type, kind and/or construction, such as an ultrasonic sensor that transmits and receives ultrasonic waves WVS, for example. Additionally, it will be appreciated that height sensing device 338 can be connected to other systems and/or components of a vehicle suspension system in any suitable manner. As shown in FIG. 3, height sensing device 338 includes a lead or connection 342 that can be used for such communication purposes, such as is indicated by leads 134 of control system 126 in FIG. 1, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly dimensioned to receivingly engage an associated end of an associated flexible spring member, said end member assembly having a longitudinal axis and comprising:
   a first end member section including a first section wall extending radially outward to an outer peripheral edge;

a second end member section including a second section wall that has an outer surface dimensioned such that the associated flexible spring member can form a rolling lobe therealong, said second end member section secured to said first end member section such that an end member chamber is defined therebetween;

an end member partition section disposed between said first and second end member sections, said end member partition section separating said end member chamber into at least a first chamber portion disposed toward said first end member section and a second chamber portion disposed toward said second end member section with a passage extending through said end member partition, said end member partition section including an inner peripheral edge and an outer peripheral edge with said inner peripheral edge disposed along said first section wall of said first end member section and said outer peripheral edge disposed along said second section wall of said second end member section; and, a control device disposed in fluid communication along said passage in said end member partition section, said control device operative between:
   a first condition in which said first and second end member chambers are fluidically isolated from one another through said passage under differential pressure conditions at or below a predetermined pressure threshold; and,
   a second condition in which said first and second end member chambers are disposed in fluid communication with one another through said passage under differential pressure conditions exceeding said predetermined pressure threshold.

2. An end member assembly according to claim 1, wherein said second section wall of said second end member section includes an end wall portion that at least partially defines a mounting plane of said end member assembly.

3. An end member assembly according to claim 2, wherein said end wall portion is a first end wall portion and said second section wall includes a second end wall portion spaced longitudinally from said first end wall portion in a direction away from said first end member section such that at least a portion of said end member volume is disposed beyond said mounting plane in a direction away from said first end member section.

4. An end member assembly according to claim 3, wherein said second section wall includes an outer side wall portion that at least partially defines an outer periphery of said end member volume within said second end member section.

5. An end member assembly according to claim 4, wherein said second section wall includes an inner side wall portion disposed radially inward of said outer side wall portion and axially co-extensive with at least a portion thereof to define an inner periphery of said end member volume such that an external recess extends into said end member assembly with said end member volume extending peripherally around said recess along at least three sides thereof.

6. An end member assembly according to claim 1, wherein said control device is a normally-closed, one-way valve actuated and deactuated by differential pressure conditions.

7. An end member assembly according to claim 1, wherein said first section wall of said first end member section includes at least one vent passage extending therethrough in fluid communication with said second chamber portion of said end member chamber, said at least one vent passage dimensioned to substantially inhibit pressurized gas transfer from said first chamber portion into said second chamber portion under at least said differential pressure conditions exceeding said predetermined pressure threshold.

8. An end member assembly according to claim 1, wherein said second section wall includes a plurality of intermediate wall portions disposed within said second chamber portion, said plurality of intermediate wall portions including distal edges at least a portion of which are disposed in abutting engagement with said end member partition section.

9. An end member assembly according to claim 8, wherein said end member partition section includes a partition section wall with a plurality of ribs disposed in peripherally-spaced relation to one another along said end member partition section in facing relation to said plurality of intermediate wall portions.

10. An end member assembly according to claim 9, wherein said plurality of ribs are spaced apart in pairs with one of said ribs disposed along opposing sides of one of said intermediate wall portions.

11. An end member assembly according to claim 8, wherein said end member partition section includes a partition section wall having a cross-sectional profile, and distal edges of said plurality of intermediate wall portions have a complementary profile.

12. An end member assembly according to claim 1, wherein said end member partition section is secured to one of said first end member section and said second end member section along at least one of said inner and outer peripheral edges.

13. An end member assembly according to claim 1, wherein said inner peripheral edge is secured to said first end member section such that a substantially fluid-tight joint is formed therebetween.

14. An end member assembly according to claim 1, wherein said outer peripheral edge is secured to said second end member section such that a substantially fluid-tight joint is formed therebetween.

15. A gas spring assembly comprising:
   a flexible spring member including a flexible wall and extending between opposing first and second ends;
   an end member secured across said first end of said flexible spring member; and,
   an end member assembly according to claim 1 secured across said second end of said flexible spring member.

16. An end member assembly according to claim 1, wherein said second section wall includes an outer peripheral edge, and said first and second end member sections are secured together with a substantially fluid-tight joint formed between said outer peripheral edge of said first section wall and said outer peripheral edge of said second section wall.

17. A method of assembling a gas spring assembly, said method comprising:
   providing a first end member section that includes a first section wall extending radially outward to an outer peripheral edge;
   providing a second end member section that includes a second section wall with an outer peripheral edge;
   securing said first and second end member sections to one another along said outer peripheral edges thereof such that an end member volume is defined therebetween;
   providing an end member partition section that includes a partition section wall with a passage extending therethrough as well as an inner peripheral edge and an outer peripheral edge;

positioning said end member partition section between said first and second end member sections with said inner peripheral edge disposed along said first end member section and said outer peripheral edge disposed along said second end member section thereby separating said end member volume into at least first and second end member chambers;

providing a control device operatively displaceable between a first operative condition and a second operative condition; and, connecting said control device in fluid communication along said passage through said end member partition section such that:

under differential pressure conditions at or below a predetermined pressure threshold, said control device is in said first operative condition in which said first and second end member chambers are fluidically isolated from one another through said passage; and, under differential pressure conditions exceeding said predetermined pressure threshold, said control device is in said second operative condition in which said first and second end member chambers are disposed in fluid communication with one another through said passage.

18. A method according to claim 17 further comprising securing said end member partition section to at least one of said first and second end member sections.

19. A method according to claim 18, wherein securing said end member partition section includes securing said partition section wall to one of said first end member section and said second end member section respectively along at least one of said inner and outer peripheral edges.

20. A method according to claim 19, wherein securing said end member partition section includes at least one of:

securing said inner peripheral edge along said first end member section such that a substantially fluid-tight joint is formed therebetween; and, securing said outer peripheral edge along said second end member section such that a substantially fluid-tight joint is formed therebetween.

* * * * *